UNITED STATES PATENT OFFICE.

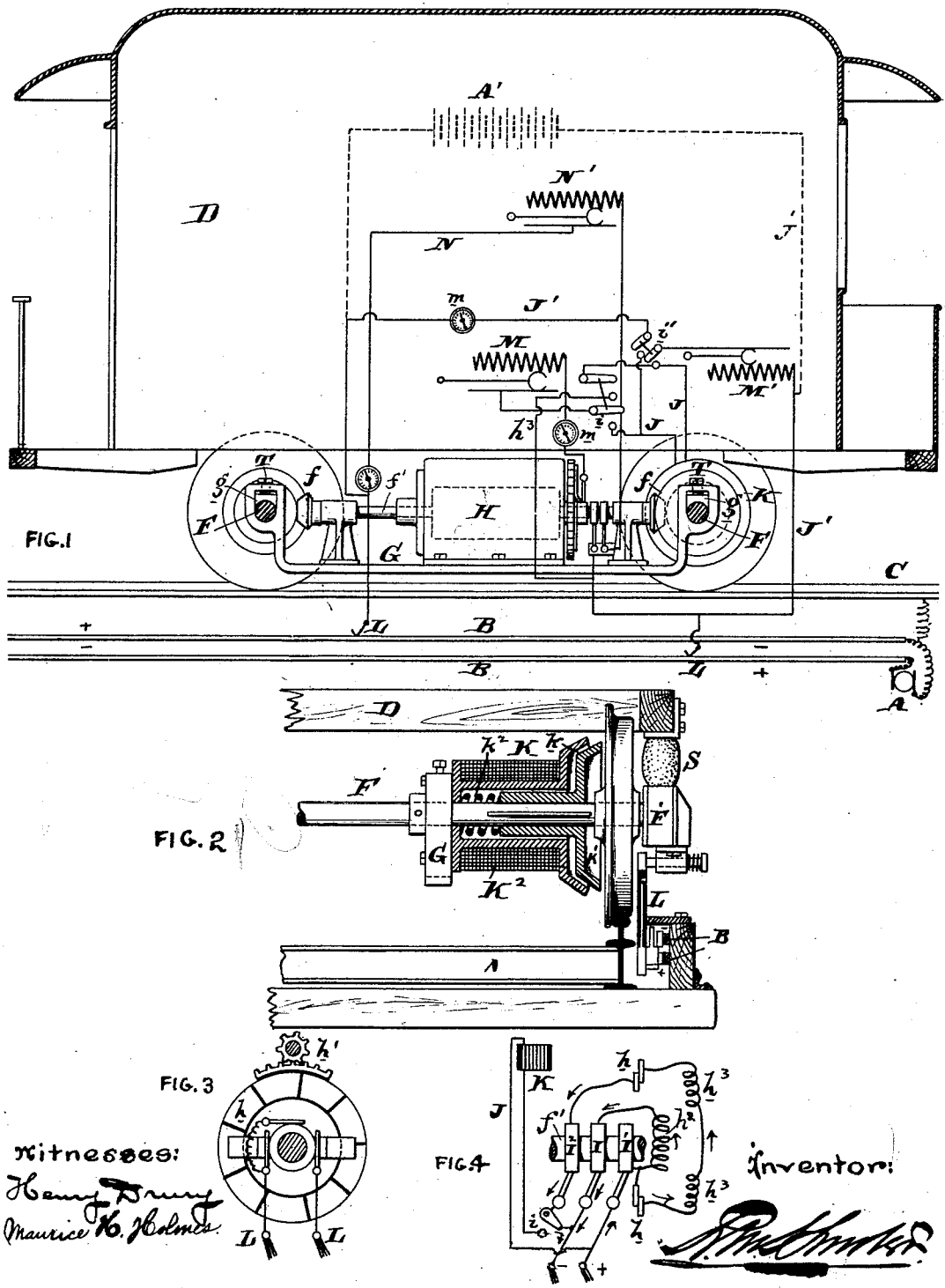

RUDOLPH M. HUNTER, OF PHILADELPHIA, PENNSYLVANIA, ASSIGNOR TO THE ELECTRIC CAR COMPANY OF AMERICA, OF SAME PLACE.

ELECTRIC RAILWAY.

SPECIFICATION forming part of Letters Patent No. 434,147, dated August 12, 1890.

Original application filed June 9, 1886, Serial No. 204,583. Divided and this application filed April 11, 1890. Serial No. 347,509. (No model.)

*To all whom it may concern:*

Be it known that I, RUDOLPH M. HUNTER, of Philadelphia, county of Philadelphia, and State of Pennsylvania, have invented an Improvement in Electric Railways, of which the following is a specification.

My invention has reference to electric railways; and it consists in certain improvements, all of which are fully set forth in the following specification, and shown in the accompanying drawings, which form part thereof.

This application, Case 133, is a division of my application No. 204,583, filed June 9, 1886.

My improvements relate to the constructions employed on the car or vehicle for propelling and regulating its movement.

In carrying out my invention, so far as the motor or car is concerned, I provide a motor-frame supported directly or indirectly on the car-axles and made adjustable therewith, and upon this frame I secure the motor, which may be of any desired type, that shown being of the type in which the field-magnets rotate and the armature-ring is stationary. I therefore secure the armature-ring to the frame and connect the rotating field-magnets to the axles by gearing or otherwise. I also provide the armature-circuit with a resistance-changer under the control of the operator for varying the resistance at will. When the motor is to be run as a braking-dynamo, it simply becomes necessary to increase the field by reducing the resistance in the field-circuit, and, if desired, increasing the resistance in the armature-circuit, so that the counter electro-motive force shall increase over the initial electro-motive force of the motor. This slows down the car or train, and as it slows the difference between the power of the field and armature must still be increased, as with the reduced speed of the motor the counter electro-motive force also decreases. To stop the car I provide an electric brake, which may be either coupled up in the line-circuit or in the armature-circuit. The instant the armature is cut out of line it becomes a generator or dynamo-electric machine, and the armature-current is expended in its short circuit in overcoming the resistance, which resistance may be varied by a suitable resistance-changer. When so connected, it also acts as a brake, as the tendency would be to stop or arrest the rotation of the field-magnet. When coupled up with the brake, the armature-circuit (the motor being converted into a generator) transmits a current which actuates the brake, and the strength of this current may be controlled by a variable resistance in said circuit. In the case when the brake-circuit is coupled up into line, or in a derived circuit around the motor, I also provide a resistance-changer to control the strength of current and thereby regulate the power of the brake.

In the drawings, Figure 1 is a sectional elevation of an electric car embodying my invention. Fig. 2 is a cross-section of part of same, showing the brake. Fig. 3 is a front elevation of the motor, showing the commutator-segments and brushes, and Fig. 4 is a diagram illustrating the general arrangement of the motor-circuits.

A is the electric generator or source of supply, and B B are the line-conductors when a stationary source of energy is employed. The conductors B may be the rails or separate conductors, or part rails and part separate conductors, and the conductor or conductors may be arranged at any elevation or in a conduit, as desired. If the source of energy is carried with the car, it may be a battery A'.

D is the car-body, and is supported upon the axles F, journaled in boxes F' by means of springs S in the usual way.

When line-conductors are employed, current-collectors L may be carried with the car for making a traveling contact therewith, and are preferably supported by the axles or boxes independent of the car-body.

H is the motor, which is shown as of the well-known type, in which the field-magnets revolve within the stationary armature. These field-magnets are secured upon the shaft $f'$, which is connected by gearing $f$ with the axles F of the car.

N is the motor-circuit, it passing from one brush or collector L through the field-magnets and a resistance-changer N' to the other collector L, and the continuity of the circuit is never broken during the normal working of the motor.

Referring to Fig. 4, $h^2$ represents the field-magnets, and the circuit from the two collectors can be traced through the contact-rings I I' or the field-magnet or motor-shaft $f'$. The armature-coils are represented at $h^3$, and are shown as in a derived circuit around the field-magnets, being in circuit with the positive and negative currents by commutator and brushes $h$, contact-ring $I^2$, and switch $i$. The brushes for the commutator $h$ are carried by the motor-shaft. The commutators $h$ may be moved through a sufficient angle to reverse the motor by gearing $h'$ under the control of the operator with the usual lever-rack and detent device. The armature-circuit also contains a resistance-changer M, by which the amount of current passing through the armature may be regulated.

Referring now to Fig. 1, it will be seen that by moving the switch $i$ up the armature-circuit will be cut out of line and be closed upon itself, including the resistance M. When this is done, the motor will be converted into a dynamo-electric machine and tends to act as a brake to stop the train. The current generated in the armature-circuit is consumed in overcoming the resistance M, which may be increased as desired. If the switch $i$ be moved down, the armature would still be cut out of line-circuit, but would now include the brake K, the coils $K^2$ of which and circuit J being coupled up with the armature-circuit, so that after the braking-dynamo has slowed down the train it may be stopped by putting on the friction-brake. The power of this friction-brake may be increased or decreased by decreasing or increasing the resistance M. The power of the current generated by the motor may be materially varied by operating the resistance-changer N', which regulates the resistance of the field-magnet circuit, as it is evident that when running the motor as a generator a variation in the strength of the field will cause a corresponding variation in the armature-current.

Aside from operating the friction-brake K by the armature-current, this brake may be operated by the current from the source of supply with or without converting the motor into a generator by a circuit J' and switch $i'$, which closes a shunt-circuit through the brake-coils and a resistance-changer M', and connects with the wires N on each side of the motor, shunting the motor and decreasing its strength. Even while the brake-coils $K^2$ are being traversed by the line-current the motor may be converted into a generator, and the armature-current so generated may also be made to assist in exciting the friction-brake, assisting the line-current in arresting the train or car. The resistance-changer M' regulates the power of the brake when the line-current is used.

The brake shown is very similar to that illustrated in my application filed July 14, 1885, Serial No. 171,625, and consists, essentially, of a helix $K^2$, secured to the frame G or car, and a core K', carried by the axle and rotating with it, but free to move longitudinally thereon. This armature is normally held out of the helix by a spring $k^2$; but when the helix is excited the armature is drawn in and creates a friction by the conical flanges $k$ of the helix frame and core, as shown in Fig. 2.

The motor H and its frame G may be elevated or lowered by the adjusting-screws T carried by the upper parts of the frames G, said screws pressing upon adjustable bearings $g$, resting on the axles. This construction enables the gearing to be kept in perfect alignment, and allows of more ready adjustment of the motor-shaft with respect to the axles.

I do not limit myself to the details of construction, as they may be modified in various ways without departing from my invention.

Having now described my invention, what I claim as new, and desire to secure by Letters Patent, is—

1. The combination, in an electrically-propelled vehicle, of a vehicle-body supported upon the axle by means of springs, a frame journaled upon the axle independently of the vehicle-body, a stationary armature, rotating field-magnet, and motor-shaft secured to and carried by said frame, and a mechanical connection between the motor-shaft and the axle to which the frame is journaled.

2. The combination, with a vehicle, of an electric motor to propel the same, a mechanical connection between the axle and motor-shaft, a source of electric energy, a field-magnet circuit, an armature-circuit, and an independent resistance-changer for each of said circuits, whereby the resistance in either circuit may be varied independently of the other, and indicators in said circuits.

3. In an electrically-propelled vehicle, the combination of a frame journaled upon the axle independently of the car-body, an electric motor carried by said frame independently of the car-body and having its motor-shaft mechanically connected with the axle to which the frame is journaled, and means to adjust the journal of the frame vertically upon the axle.

4. The combination, with a vehicle, of an electric motor to propel the same, a field-magnet circuit, an armature-circuit, an independent resistance-changer for each of said circuits, whereby the resistance in either circuit may be varied independently of the other, switches to put said armature into a braking-circuit, and an electric friction-brake in said braking-circuit.

5. The combination, with a vehicle, of an electric motor to propel the same, a field-magnet circuit, an armature-circuit, an independent resistance-changer for each of said circuits, whereby the resistance in either circuit may be varied independently of the other, switches to put said armature into or out of line-circuit, and switches to put said armature into a braking-circuit, and an electric friction-brake in said braking-circuit.

6. The combination, with a vehicle, of an electric motor to propel the same, a field-magnet circuit, an armature-circuit, an independent resistance-changer for each of said circuits, whereby the resistance in either circuit may be varied independently of the other, switches to short-circuit the armature and cut it out of line or source of electric supply, a brake-circuit, switches to couple the brake-circuit into the armature-circuit, and indicators in said circuits.

7. The combination, with a vehicle, of an electric motor to propel the same, a field-magnet circuit, an armature-circuit, an independent resistance-changer for each of said circuits, whereby the resistance in either circuit may be varied independently of the other, switches to put said armature into a braking-circuit, an electric friction-brake in said braking-circuit, and a circuit and switch for connecting said electric friction-brake with the circuit leading from the source of electric supply.

8. The combination, with a vehicle, of an electric motor to propel the same, a field-magnet circuit, an armature-circuit, an independent resistance-changer for each of said circuits, whereby the resistance in either circuit may be varied independently of the other, switches to put said armature into a braking-circuit, an electric friction-brake in said braking-circuit, a circuit and switch for connecting said electric friction-brake with the circuit leading from the source of electric supply, and a resistance-changer in said last-mentioned circuit to vary the power of the brake.

9. The combination, with a vehicle, of an electric motor to propel the same, a field-magnet circuit, an armature-circuit, an independent resistance-changer for each of said circuits, whereby the resistance in either circuit may be varied independenly of the other, switches to put said armature into a braking-circuit, and an electric friction-brake in said braking-circuit, a circuit and switch for connecting said electric friction-brake with the circuit leading from the source of electric supply, a resistance-changer in said last-mentioned circuit to vary the power of the brake, and an indicator also in said circuit.

10. The combination, with a vehicle, of an electric motor to propel the same, a field-magnet circuit, an armature-circuit, an independent resistance-changer for each of said circuits, whereby the resistance in either circuit may be varied independently of the other, switches to put said armature into a braking-circuit, an electric friction-brake in said braking-circuit, a circuit and switch for connecting said electric friction-brake with the circuit leading from the source of electric supply, and an indicator in said last-mentioned circuit.

11. The combination of a vehicle or car, an electric motor to propel the same, an electric friction-brake, a brake-circuit connecting with a source of energy common to both the motor and brake, switches for simultaneously and independently connecting the brake and motor with the source of electrical energy, and a resistance-changer in said brake-circuit.

12. The combination of a vehicle or car, an electric motor to propel the same, an electric friction-brake, a brake-circuit connecting with a source of energy common to both the motor and brake, switches for simultaneously and independently connecting the brake and motor with the source of electrical energy, an indicator, and a resistance-changer in said brake-circuit.

13. The combination of a vehicle or car, an electric motor to propel the same, an electric friction-brake, a brake-circuit connecting with a source of energy common to both the motor and brake without interfering with the normal connection of the motor and without connection with the motor-circuit, a switch or key to apply the brake, and an indicator in said brake-circuit.

14. The combination of a vehicle or car, an electric motor to propel the same, a source of electric energy, a field-magnet circuit, an armature-circuit, switches for coupling up the armature with the source of electrical energy independently of the brake or with the braking-circuit, a switch to couple up the brake with the source of electrical energy independently of the motor, and a resistance-changer adapted to vary the resistance in the field-magnet circuit.

15. The combination of a vehicle or car, an electric motor to propel the same, a source of electric energy, a field-magnet circuit, an indicator in said field-magnet circuit, an armature-circuit, switches for coupling up the armature with the source of electrical energy independently of the brake or with the braking-circuit, a switch to couple up the brake with the source of electrical energy independently of the motor, and a resistance-changer adapted to vary the resistance in the field-magnet circuit.

16. The combination of a vehicle or car, an electric motor to propel the same, a source of electric energy, a field-magnet circuit, an armature-circuit, an indicator in said armature-circuit, switches for coupling up the armature with the source of electrical energy independently of the brake or with the braking-circuit, a switch to couple up the brake with the source of electrical energy independently of the motor, and a resistance-changer adapted to vary the resistance in the field-magnet circuit.

17. The combination of a vehicle or car, an electric motor to propel the same, a source of electric energy, a field-magnet circuit, an armature-circuit, indicators in both the field-magnet and armature circuits, switches for coupling up the armature in line or braking circuit, and a resistance-changer adapted to vary the resistance in the field-magnet circuit.

18. The combination of an electrically-propelled vehicle, a motor-frame secured upon the axles thereof, an electric motor carried by said frame, and adjusting devices to adjust the height of the motor with reference to the axles.

19. The combination of an electrically-propelled vehicle, a motor-frame secured upon the axles thereof, an electric motor carried by said frame, suitable gearing connecting the motor-shaft with one or both of the axles, and adjusting devices to adjust the height of the motor with reference to the axles.

20. The combination of an electrically-propelled vehicle, a motor-frame supported upon the axles independent of the car-body, an electric motor carried thereon and having its armature stationary and secured thereto and its field-magnets adapted to rotate and positively connected with one or both the axles of the vehicle.

21. The combination of an electrically-propelled vehicle, a motor-frame supported upon the axles independent of the car-body, an electric motor carried thereon and having its armature stationary and secured thereto and its field-magnets adapted to rotate and positively connected with one or both the axles of the vehicle, a stationary commutator, and traveling brushes carried by the rotating field-magnets or their shaft.

22. The combination of an electrically-propelled vehicle, a motor-frame supported upon the axles independent of the car-body, an electric motor carried thereon and having its armature stationary and secured thereto and its field-magnets adapted to rotate and positively connected with one or both the axles of the vehicle, a stationary commutator, traveling brushes carried by the rotating field-magnets or their shaft, and means to adjust the commutator for reversing the motor.

23. In an electrically-propelled vehicle, a motor-frame suspended from the vehicle-axles and extending down close to the track or roadway, so as to bring the center of gravity of the motor low down with respect to the axles, and an electric motor supported upon said frame and extending below the axles, and having its driving-shaft substantially in the horizontal plane of the vehicle-axles.

24. In an electric railway, the combination of an electrically-propelled vehicle having a car-body supported on springs, an independent frame supported by the axles, and an electric motor carried by said vehicle and having its armature secured to the said frame and its field-magnets adapted to rotate and positively connected to the vehicle-axle.

In testimony of which invention I have hereunto set my hand.

R. M. HUNTER.

Witnesses:
ERNEST HOWARD HUNTER,
MAURICE H. HOLMES.